(12) United States Patent
Morita

(10) Patent No.: US 8,488,169 B2
(45) Date of Patent: Jul. 16, 2013

(54) INFORMATION EQUIPMENT AND IMAGE FORMING APPARATUS EFFECTIVELY DISPLAYING SPECIFIC INFORMATION AND METHOD OF DISPLAY

(75) Inventor: Takafumi Morita, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 379 days.

(21) Appl. No.: 12/925,967

(22) Filed: Nov. 3, 2010

(65) Prior Publication Data

US 2011/0102841 A1     May 5, 2011

(30) Foreign Application Priority Data

Nov. 5, 2009   (JP) ................................ 2009-253678

(51) Int. Cl.
*G06F 15/00*     (2006.01)
(52) U.S. Cl.
USPC ........................................................ 358/1.15
(58) Field of Classification Search
USPC ........................................................ 358/1.15
See application file for complete search history.

(56) References Cited

U.S. PATENT DOCUMENTS

2007/0143698 A1*   6/2007   Iwata ............................. 715/764
2008/0079659 A1    4/2008   Kunita et al.

FOREIGN PATENT DOCUMENTS

| JP | 8-016121 A | 1/1996 |
|---|---|---|
| JP | 9-311837 A | 12/1997 |
| JP | 2002-077491 | 3/2002 |
| JP | 2003-211799 | 7/2003 |
| JP | 2007-174219 A | 7/2007 |
| JP | 2008-092368 A | 4/2008 |
| JP | 2008-175862 | 7/2008 |

* cited by examiner

*Primary Examiner* — Saeid Ebrahimi Dehkordy
(74) *Attorney, Agent, or Firm* — Edwards Wildman Palmer LLP; David G. Conlin; David A. Tucker

(57) ABSTRACT

In an image forming apparatus, in order to appropriately notify a user of useful information when a screen saver is cancelled by an operation by the user, a CPU of the image forming apparatus executes a program including the step of: displaying, if the user does not make any operation in a time period of a predetermined length, a screen saver using read display information; displaying, if a user makes any operation while the screen saver is displayed, read end information; and displaying, if the user makes any operation before the time is up while the end information is displayed or if the time is up without user operation, an initial image of the image forming apparatus.

13 Claims, 12 Drawing Sheets

FIG. 6

| IMAGE FORMING APPARATUS ID INFORMATION | DISPLAY INFORMATION | END INFORMATION | REGISTERED PERSON | REMARKS |
|---|---|---|---|---|
| MFP00001 | CONTENT(1) | INFORMATION(1) | ADMIN(A) | ... |
| MFP00002 | CONTENT(2) | INFORMATION(3) | ADMIN(A) | ... |
| MFP00003 | CONTENT(1) | INFORMATION(1) | ADMIN(C) | ... |
| MFP00004 | CONTENT(1) | INFORMATION(2) | ADMIN(B) | ... |
| ... | ... | ... | ... | ... |

FIG. 9

○○ CAMPAIGN

METHOD OF APPLICATION (1)
(2)
(3)

*IF YOU ARE IN A HURRY, PLEASE TOUCH THE SCREEN

FIG. 10

NOTICE FROM ADMINISTRATOR

NETWORK WILL BE SHUT DOWN TOMORROW
DETAILS ARE AS FOLLOWS
(1) DATE AND TIME
(2) SCOPE
(3) REMARKS
. . .

*IF YOU ARE IN A HURRY, PLEASE TOUCH THE SCREEN

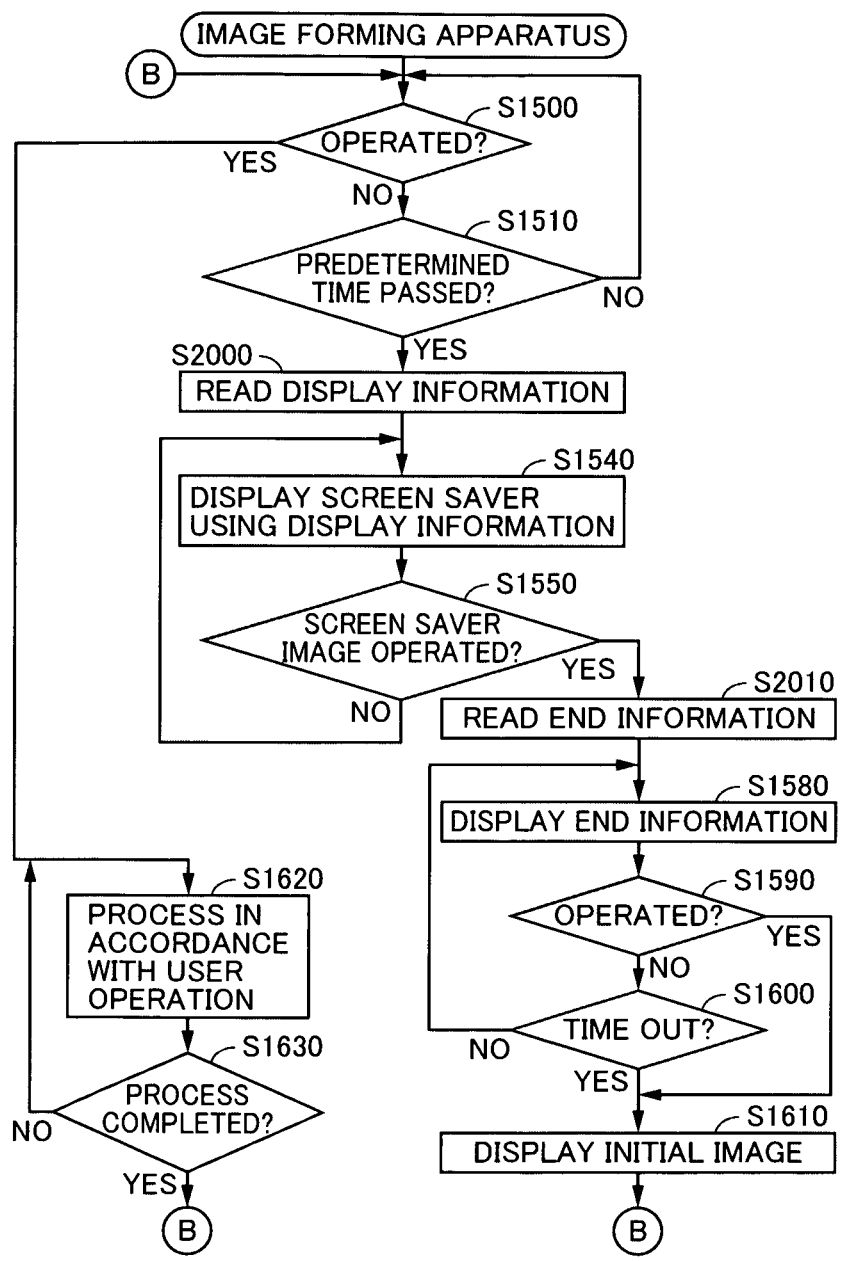

INFORMATION EQUIPMENT AND IMAGE FORMING APPARATUS EFFECTIVELY DISPLAYING SPECIFIC INFORMATION AND METHOD OF DISPLAY

CROSS-REFERENCE TO RELATED APPLICATION

This nonprovisional application claims priority under 35 U.S.C. §119(a) on Patent Application No. 2009-253678 filed in Japan on Nov. 5, 2009, the entire contents of which are hereby incorporated by reference.

BACKGROUND OF THE INVENTION

1. Field of the Invention

The present invention relates to information equipment having a standby mode (screen saver display mode) of displaying a standby image (screen saver) in the absence of any user operation, to prevent others from viewing an image displayed on the screen. More specifically, the present invention relates to information equipment and display method of appropriately presenting information to the user when a normal mode (operation image display mode) of operation is resumed from the standby mode. The present invention also relates to an image forming apparatus as one type of the information equipment.

2. Description of the Background Art

As one type of information equipment, image forming apparatuses (typically, copy machines) are introduced to many places of business (companies and offices). In such a place of business, it has become increasingly common to connect an image forming apparatus having a printer function or a copy function to a network, to allow use by a plurality of users. A multifunction peripheral (MFP) as one type of such image forming apparatuses has a plurality of basic modes such as a copy mode, a facsimile mode (hereinafter "facsimile" may also be denoted as FAX or fax), a network-supported printer mode and a scanner mode. In such an image forming apparatus, each user selects a basic mode and sets a function of duplex (two-sided) printing or collective printing (such as 2-in-1 by which two pages of an original document are printed on one sheet, or 4-in-1 by which four pages of an original document are printed on one sheet), whereby images are formed on sheets of paper in a desired manner. Appropriate combinations of these functions come to be more frequently used.

When a user uses such an image forming apparatus, for example, the user inputs image data in the scanner mode, performs image processing (such as collection) by inputting various instructions through an operation panel, and prints the results in the printer mode. In such a situation, the operation panel having the functions of an operation unit and a display unit functions as an interface between the image forming apparatus and the user. Generally, operation status of each mode is displayed on the operation panel, to allow the user to grasp the operation status mode by mode. In the printer mode that is executed upon reception of data from external equipment, operation status of each function is displayed in accordance with the data received from the external equipment as a source.

Sometimes, the operation panel is used to display information such as advertisement or news distributed through a communication network, during an idle state of the image forming apparatus or during an output operation that takes long time. While display information such as advertisement or news is displayed on the operation panel, if an internal operation status of the image forming apparatus changes or data is received from external equipment and thereby the operation status changes, the display on the operation panel is switched to the operation image. As a result, the displayed advertisement or news may be interrupted, possibly disappointing the user, or failing to transmit accurate information. On the other hand, if the display of advertisement or news is continued, it is impossible to inform the user of the change in the operation status. Japanese Patent Laying-Open No. 2003-211799 (hereinafter referred to as "'799 Reference") discloses an image forming apparatus that allows display of operation information even when a standby image is being displayed on the operation panel, to improve convenience.

The image forming apparatus disclosed in '799 Reference includes: a receiving unit connected to external equipment through a network, for receiving information from the external equipment; an input unit for inputting image information; an output condition input unit for inputting output condition information of the image information; an output unit forming and outputting image based on the information received by the receiving unit and the pieces of information input through the input unit and the output condition input unit; and a display unit integrated with an operation unit for operation input. On a part of the display unit, an operation information display area is set, for displaying operation information. The image forming apparatus includes: an operation information display unit changing the operation information to be displayed in accordance with the information received by the receiving unit and the pieces of information input through the input unit and the output condition input unit; and a display control unit monitoring presence/absence of any operation on the operation unit, for switching and displaying the operation image and the standby image on the display area other than the operation information display area. Particularly, in a state in which the operation image is displayed on the display area other than the operation information display area, the display control unit switches the image to be displayed on the display area other than the operation information display area to the standby image, if no operation is made on the operation unit for a prescribed time period.

The image forming apparatus has the operation information display area on the display unit, and displays the operation information indicating the operation status in each mode. When the operation status changes in accordance with the information received from the external equipment connected through the network and the information input by the user, the operation information is changed and displayed. On the other hand, on the area other than the operation information display area, the display is switched from the operation image to the standby image depending on the presence/absence of any operation on the operation unit. Therefore, it is possible to provide the operation information constantly to the user, without switching the display from the standby image to the operation image every time the operation status changes while the standby image is being displayed. In the state in which the operation image is displayed, if no operation is made for a prescribed time period on the operation unit, the standby image is displayed on the display area other than the operation information display area. Therefore, if it is unnecessary to display the operation image, arbitrary image can be displayed as the standby image on the display unit.

Japanese Patent Laying-Open No. 2008-175862 (hereinafter referred to as "862 Reference") discloses an image forming apparatus that displays, as a screen saver, demonstration of a method of setting various functions related to image formation.

The techniques disclosed in '799 and '862 References merely display an icon indicating the operation status of the image forming apparatus together with the screen saver on the display panel, or display demonstration of the method of setting functions of the image forming apparatus on the display monitor, in the standby mode (screen saver display mode).

In the state in which the screen saver is displayed (screen saver display mode), if a user who wishes to use the image forming apparatus makes a specific operation (for example, if the user touches the display panel or presses a return button), the image forming apparatus returns to the normal mode. Specifically, by the user operation, the screen saver display mode is cancelled and the image that has been displayed before the display of screen saver starts is resumed. In the image forming apparatus (MFP) as one type of information equipment, by way of example, an initial image allowing selection of a basic mode is displayed. At the time when the screen saver display mode is cancelled, it is often the case that the user unthinkingly makes a specific operation such as touching the display panel, though the display panel of the image forming apparatus is within his/her field of view. In such a situation, though the user is visually recognizing the display panel, he/she is merely waiting until the initial image appears.

As described above, the screen saver is displayed even when the user is not in front of the image forming apparatus. In contrast, when the display returns from the screen saver display mode in response to the user's operation, the user is surely viewing the display panel. If any information is given to the user on this occasion, the possibility of the user viewing the information becomes significantly higher than when the information is displayed simply as the screen saver. For instance, though the demonstration is given as the screen saver in the image forming apparatus disclosed in '862 Reference, the demonstration may not at all be noticed by the user.

Such a technique of appropriately giving information to the user is not disclosed or suggested in '799 Reference or '862 Reference. Further, such a technique is applicable not only to the image forming apparatus but also to any information equipment having the screen saver display mode, such as a personal computer.

SUMMARY OF THE INVENTION

Therefore, an object of the present invention is to provide information equipment and image forming apparatus in which a standby image is displayed in the absence of any user operation (no operation state), capable of executing a process for appropriately giving information to the user when the standby image is cancelled by a user operation and switched to an operation image, as well as to provide such a display method.

According to an aspect, the present invention provides information equipment that switches display of an operation image and a standby image. The information equipment includes: a display device displaying information to a user; an operating device to be operated by the user; and a control device controlling the display device. The display device and the operating device are arranged close to each other. The control device includes: a transition control unit controlling the display device such that the standby image is displayed if a predetermined transition condition related to a state of the information equipment is satisfied; a return control unit controlling the display device such that the operation image is displayed if a predetermined return condition related to a user operation using the information equipment is satisfied; and a switch control unit controlling the display device such that a specific image including a piece of information different from the operation image and the standby image is displayed after ending display of the standby image and before starting display of the operation image, when the standby image is switched to the operation image.

In the information equipment, if a predetermined transition condition related to the status of the information equipment is satisfied (for example, if a time period in which the user makes no operation exceeded a predetermined time period), the standby image is displayed. While the standby image is being displayed, if a predetermined returning condition related to the user operation is satisfied (for example, if the user makes any operation), the display is switched to the operation image. On this occasion, after the end of display of the standby image and before the start of display of the operation image, a specific image is displayed. The specific image includes information different from the operation image and the standby image. When the user operates the operating device so that the standby image is switched to the operation image, it follows that the user is at such a position that allows operation of the operating device. At this position, it is possible for the user to visually recognize the specific image displayed on the display device arranged close to the operating device. In this manner, if the user who wishes to have the display switched from the standby image to the operation image operates the operating device, it is possible for the user to recognize the specific image displayed on the display device arranged in the vicinity of the operating device. Therefore, when information useful for the user is displayed as the specific image, it is possible to give useful information to the user using the information equipment. As a result, an apparatus displaying a standby image can execute the process of appropriately giving information to the user, when the display of standby image is cancelled by the user operation and switched to the operation image.

The switch control unit of the information equipment may include a first control unit controlling the display device such that the specific image is displayed for a time period of a predetermined length. The switch control unit may further include a second control unit controlling the display device such that the operation image is displayed if the user operates the operating device in the time period in which the specific image is displayed.

By such an approach, it becomes possible to have the specific image displayed for a time period sufficient for the user to recognize the information included in the specific image and, therefore, the user can easily grasp the information included in the specific image. If the user who does not need to closely watch the specific image (for example, the user who already viewed the specific image before) operates the operating device, the display is switched from the specific image to the operation image. Therefore, it is unnecessary for the user who wishes to use the information equipment immediately to wait until the end of display of the specific image.

The specific image may include a piece of information related to information included in the standby image. The specific image may include a piece of information related to the user using the information equipment.

By such an approach, it is possible for the user viewing the standby image to easily obtain the information related to the information included in the standby image. Further, it is possible for the user using the information equipment to easily obtain information related to the user (such as a notice of the workplace to which the user belongs).

The transition control unit may include a transition unit controlling the display device such that the standby image is displayed if a condition that the user does not operate the operating device for a time period of a predetermined length is satisfied.

By such an approach, if a condition that the user has not operated the operating device (touch-panel display, keyboard, mouse or the like) for a predetermined time period is satisfied, the standby image is displayed. When the standby image entered in this manner is switched to the operation image, it is possible to have the user recognize the specific image.

The return control unit of the information equipment may include a return unit controlling the display device such that the operation image is displayed if a condition that the user operated the operating device is satisfied.

By such an approach, if a condition that the user having the display device (monitor, touch-panel display or the like) in his/her field of view while the standby image is displayed has operated the operating device (touch-panel display, keyboard, mouse or the like) is satisfied, after the display of the standby state ends and the specific image is displayed, the display is switched to the operation image. Therefore, the user can easily recognize the information included in the specific image.

The standby image may be a screen saver image.

By such an approach, the screen saver is displayed as the standby image. It is possible to display, in the information equipment, detailed information related to the information displayed on the screen saver as the specific image.

The display device of the information equipment may include a pressure-sensitive selection button for realizing a function of the operating device.

By such an approach, while the standby image is displayed on a touch-panel display serving both as the display device and the operating device, if the user touches the panel, the display is switched from the standby image to the specific image and thereafter, the operation image is displayed. When operating (touching) the panel, the user surely watches the panel and, therefore, the user can easily recognize the information included in the specific image displayed on the panel.

Further, the information equipment may further include a communication device for communication with external equipment; and a receiving device receiving either a piece of information for displaying the standby image or a piece of information for displaying the specific image, from the external equipment.

By such an approach, it becomes possible, for example, to receive and display information for displaying the standby image or/and information for displaying the specific image, from the external equipment through the network. When various and many apparatuses as the information equipment are connected to the network, it is possible to collectively manage pieces of information to be displayed on these apparatuses by the external equipment.

According to another aspect, the present invention provides an image forming apparatus including the information equipment described above and an image forming unit forming an image on a sheet of recording paper.

In the image forming apparatus, a process for forming an image on a sheet of recording paper is executed. In such an image forming apparatus, the display device and the operating device are provided close to each other on a front side of the image forming apparatus, or a touch-panel display integrating the display device and the operating device is provided. In the image forming apparatus as such, when the user operates the operating device to switch the display from the standby image to the operation image, it follows that the user is on such a position that allows operation of the operating device and allows visual recognition of the specific image displayed on the display device. Therefore, when the user who wishes to have the display switched from the standby image to the operation image operates the operating device, the user can easily recognize the specific image displayed on the display device.

The image forming apparatus may further include a display control unit controlling the display device such that the specific image is displayed during image formation on recording paper by the image forming unit.

By such an approach, the specific image is displayed in the wait time while the image is formed on a large number of sheets of recording paper and, therefore, it is possible to give useful information to the user. In this manner, the wait time, which has been spent by simply waiting, can be turned to a time period in which the user can obtain useful information included in the specific image.

According to a still further aspect, the present invention provides, in information equipment switching display of an operation image and a standby image, including a display device displaying information to a user and an operating device to be operated by the user arranged close to the display device, a method of display including the steps of controlling the display device such that the standby image is displayed if a predetermined transition condition related to a state of the information equipment is satisfied; controlling the display device such that the operation image is displayed if a predetermined return condition related to a user operation using the information equipment is satisfied; and controlling the display device such that a specific image including a piece of information different from the operation image and the standby image is displayed after ending display of the standby image and before starting display of the operation image, when the standby image is switched to the operation image.

Therefore, when the user who wishes to have the display switched from the standby image to the operation image operates the operating device, the user can easily recognize the specific image displayed on the display device arranged close to the operating device. Since the information useful for the user is displayed as the specific image, it becomes possible to give useful information to the user using the information equipment. As a result, in an apparatus on which the standby image is displayed, a process for appropriately giving information to the user can be executed when the standby image is canceled by the user operation and the display is switched to the operation image.

According to the present invention, in information equipment including an image forming apparatus, in which a standby image is displayed in the absence of user operation (no operation state), the process for appropriately giving information to the user can be executed when the standby image is cancelled by the user operation and the display is switched to the operation image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows a configuration of a message management table stored in the server computer shown in FIG. 2.

FIGS. 8 to 11 show (first to fourth) exemplary images displayed on the display panel of the image forming apparatus in accordance with an embodiment of the present invention.

FIG. 12 is a flowchart representing a control structure of a program executed by the image forming apparatus in accordance with a modification of the present invention.

DESCRIPTION OF THE PREFERRED EMBODIMENTS

Figure 1:
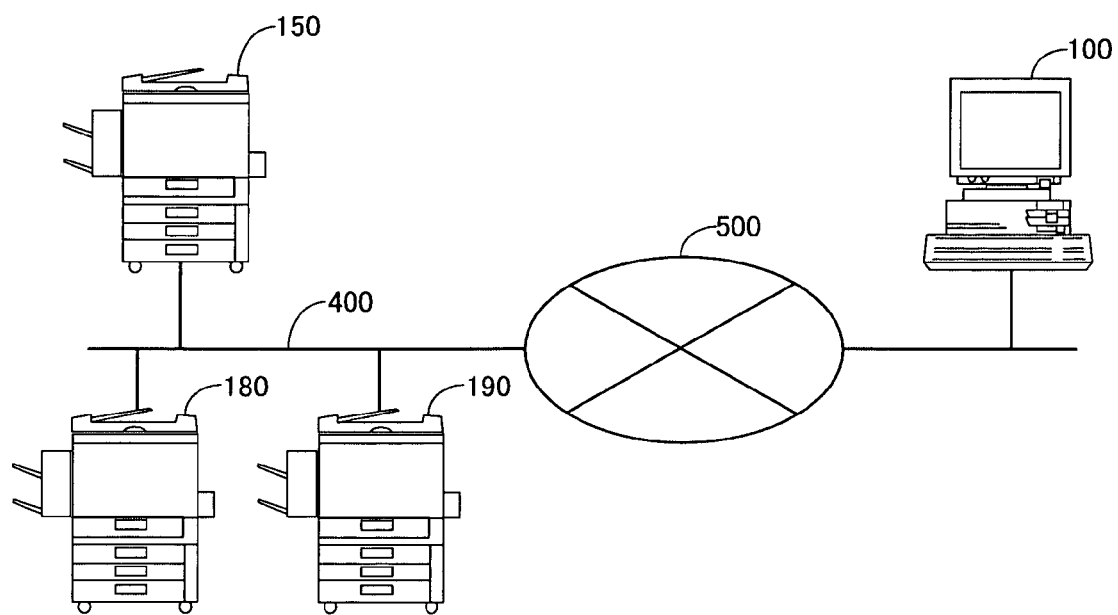
FIG. 1 shows an overall configuration of a network image forming system in accordance with an embodiment of the present invention.

In the embodiment below, the same components are denoted by the same reference characters. Their names and functions are also the same. Therefore, detailed description thereof will not be repeated.

The information equipment in accordance with an embodiment of the present invention is an image forming apparatus. The present invention is also applicable to any information equipment (for example, a personal computer) other than the image forming apparatus. The information equipment in accordance with the present invention may be any apparatus that automatically makes a transition to a mode in which display information received from a server computer as external equipment is displayed as a screen saver in the absence of any user operation for a predetermined time or longer and that can display end information received from the server computer before the initial image is displayed at the time of recovery from the screen saver. The network image forming system may not include a server computer as will be described in the modification later.

The image forming apparatus forms an image on a sheet of recording paper by electro-photography. The image forming apparatus includes copy mode, FAX mode (the display on the display panel is "FAX/IMAGE TRANSMISSION") and scanner mode (the display on the display panel is "DOCUMENT FILING"). The image forming apparatus may further include a network printer mode. The present invention, however, is not limited to the above, and the image forming apparatus having only the copy mode, FAX mode or scanner mode, or an image forming apparatus having one or more of the three modes may be used. Further, the printing method is not limited to electro-photography.

[Overall System Configuration]

Referring to FIG. 1, the overall configuration of the network image forming system including the image forming apparatus and the external equipment (server computer) in accordance with an embodiment of the present invention will be described. The network image forming system includes image forming apparatuses 150, 180 and 190. The following description will be given in relation to image forming apparatus 150. When a condition to make a transition from the normal mode (operation image (initial image) display mode) to the screen saver display mode is satisfied, image forming apparatus 150 asks the server computer for display information to be displayed as the screen saver, and displays the display information received from the server computer as the screen saver. If a condition to make a transition from the screen saver display mode to the normal mode (return condition) is satisfied, image forming apparatus 150 asks the server computer for end information to be displayed at the end of the screen saver, and displays the end information received from the server computer at the time of recovery from the screen saver. The network image forming system further includes server computer 100 transmitting the display information and the end information described above to image forming apparatus 150.

Server computer 100 and image forming apparatus 150 are connected to be communicable with each other by a network line (LAN: Local Area Network) 400 and the Internet 500. Image forming apparatuses 150, 180 and 190 may be image forming apparatuses having the same standard functions or may be apparatuses of different types. The Internet 500 may be an intranet. It is noted that a (client) computer that transmits the print data to image forming apparatus 150 is not shown in the FIG. 1.

In the present embodiment, if the condition to make a transition from the normal mode to the screen saver display mode is satisfied in image forming apparatus 150, image forming apparatus 150 and server computer 100 operate in the following manner. (1) Image forming apparatus 150 transmits a signal requesting the display information for the screen saver and an image forming apparatus identification (ID) information uniquely identifying image forming apparatus 150 (hereinafter simply referred to as "identification information") to server computer 100, through network line 400 and the Internet 500. (2) Receiving the request signal, server computer 100 transmits the display information to image forming apparatus 150 identified by the identification information through network line 400 and the Internet 500. (3) Receiving the display information, image forming apparatus 150 displays the screen saver based on the received display information, on a display panel.

If the condition to make a transition from the screen saver display mode to the normal mode is satisfied, image forming apparatus 150 and server computer 100 operate in the following manner. (1) Image forming apparatus 150 transmits a signal requesting the end information and the identification information uniquely identifying image forming apparatus 150 to server computer 100, through network line 400 and the Internet 500. (2) Receiving the request, server computer 100 transmits the end information to image forming apparatus 150 identified by the identification information, through network line 400 and the Internet 500. (3) Receiving the end information, image forming apparatus 150 displays the received end information on the display panel for a predetermined length of time at the end of the screen saver.

In this manner, in the present embodiment, image forming apparatus 150 displays the end information received from server computer 100 on the display panel at the end of the screen saver. The end information may include a piece of information related to the information that has been displayed on the screen saver, or a piece of business information the system administrator want to give to the user of image forming apparatus 150.

[Server Computer: Control Block Configuration]

Figure 2:
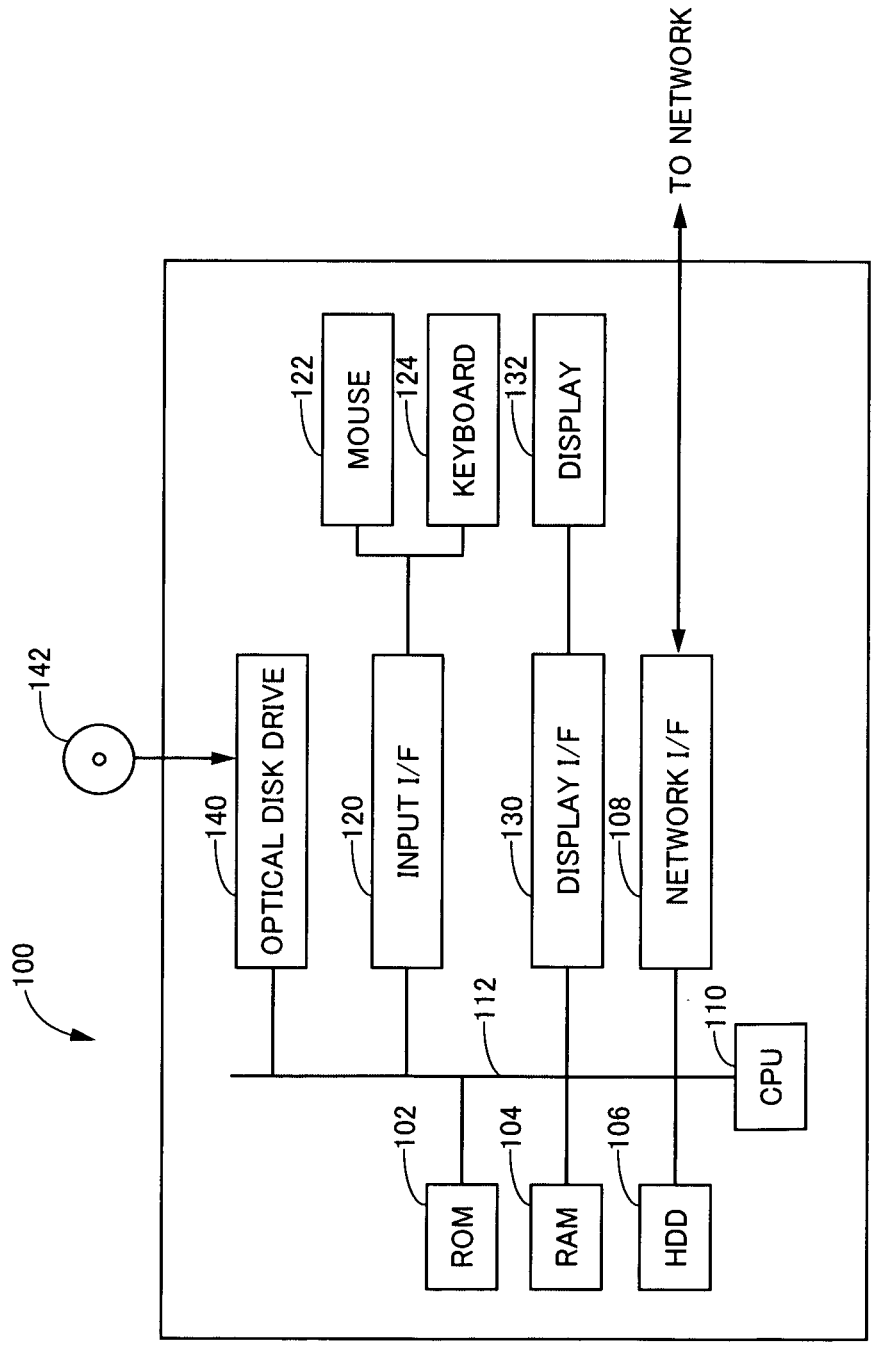
FIG. 2 is a control block diagram showing hardware configuration of the server computer shown in FIG. 1

Referring to FIG. 2, server computer 100 serving as the external equipment of the network image forming system in accordance with the present embodiment includes: a bus 112; a CPU (Central Processing Unit) 110 connected to bus 112;

an ROM (Read Only Memory) 102 connected to bus 112; an RAM (Random Access Memory) 104 connected to bus 112; a hard disk (HDD) 106 connected to bus 112; an optical disk drive 140, connected to bus 112, on which an optical disk 142 is mountable, and capable of writing information to optical disk 142 and reading information from optical disk 142; an input interface (hereinafter referred to as "input I/F", and "interface" will be denoted as "IF" or "I/F") 120, connected to bus 112, for providing an interface for connection between a mouse 122 and a keyboard 124; a display interface (hereinafter referred to as a "display I/F") 130, connected to bus 112, for providing an interface related to connection with a display 132; and a network interface (hereinafter referred to as a "network I/F") 108 providing wired or wireless (in the present embodiment, wired) connection to network line 400. Server computer 100 may include a magnetic disk drive on which a magnetic disk is mountable, and capable of writing information to the magnetic disk and reading information from the magnetic disk, in place of/in addition to optical disk drive 140.

Bus 112, ROM 102, RAM 104, hard disk 106, optical disk drive 140, input I/F 120, display I/F 130 and network I/F 108 all operate in cooperation with each other under the control of CPU 110. Server computer 100 realizes processes of various applications, as the external equipment in accordance with the present embodiment. Such applications realize a server computer in the network image forming system having, for example, the function of transmitting, when the signal requesting the display information is received from image forming apparatus 150 that satisfied the condition to make a transition from the normal mode to the screen saver display mode, the display information to the image forming apparatus 150, and the function of transmitting, when the signal requesting the end information is received from image forming apparatus 150 that satisfied the return condition to make a transition from the screen saver display mode to the normal mode, the end information to the image forming apparatus 150.

The computer program or programs causing server computer 100 to operate as the external equipment of the network image forming system in accordance with the present embodiment are stored in optical disk 142 to be inserted to optical disk drive 140, and transferred to hard disk 106. Alternatively, the programs may be transmitted through network line 400 to server computer 100 and stored in hard disk 106. At the time of execution, the programs are loaded to RAM 104. The programs may be directly loaded to RAM 104 from optical disk 142 or through network line 400.

These programs include a plurality of instructions causing server computer 100 to operate as the external equipment of the network image forming system in accordance with the present embodiment. Some of the basic functions necessary to realize these operations are provided by an operating system (OS) operating on server computer 100 or a third-party program, or a module of various tool kits installed in server computer 100. Therefore, the program may not necessarily include all functions required to realize the method and system in accordance with the present embodiment. The program may include only the instructions executing a prescribed process as server computer 100 described above, by calling appropriate functions or "tools" in a controlled manner to attain the desired results. General operations of a computer as the substance of server computer 100 are well known and, therefore, description will not be given here.

[Image Forming Apparatus: Function]

Figure 3:
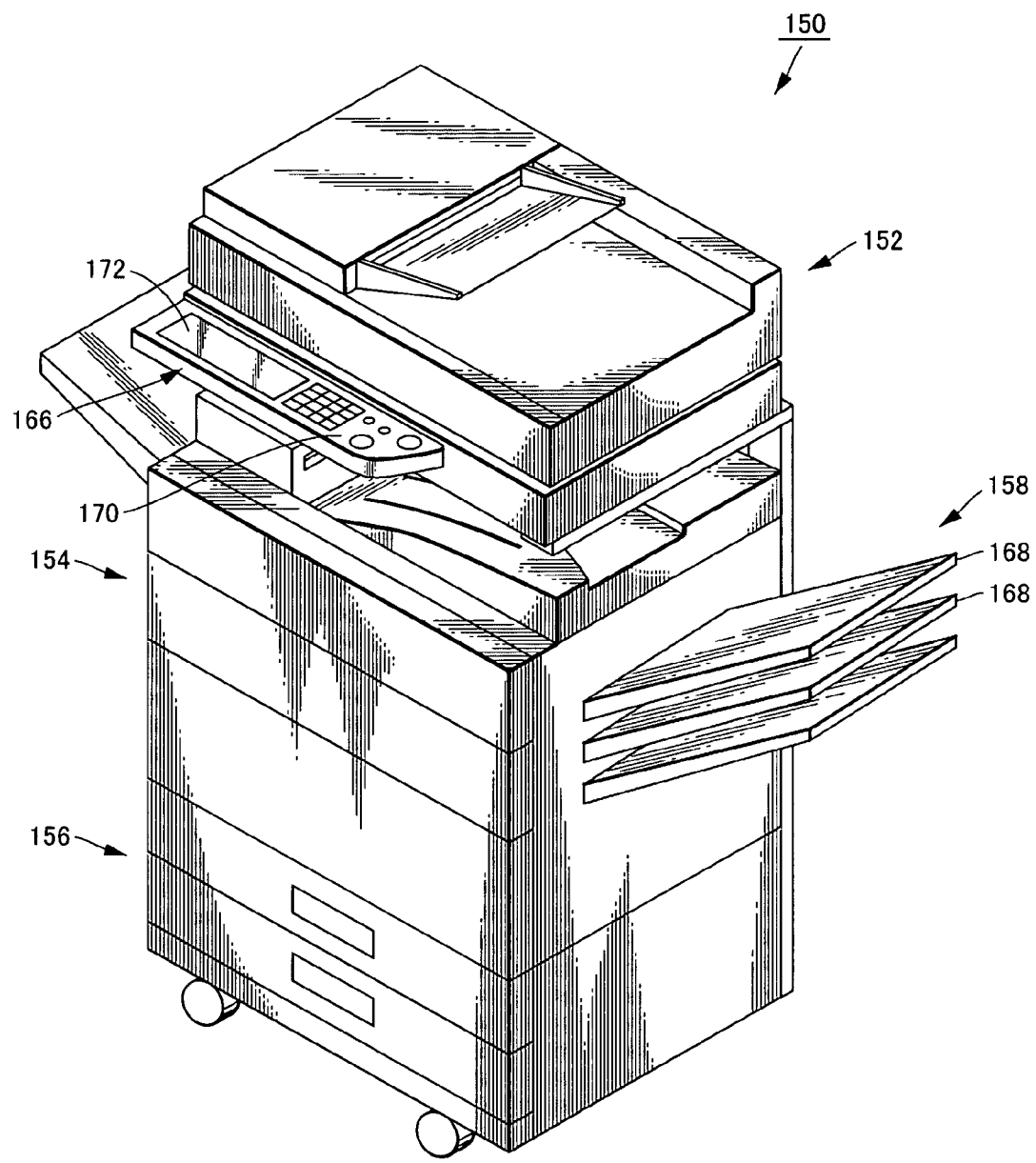
FIG. 3 is a perspective view showing an appearance of the image forming apparatus shown in FIG. 1.
Figure 4:
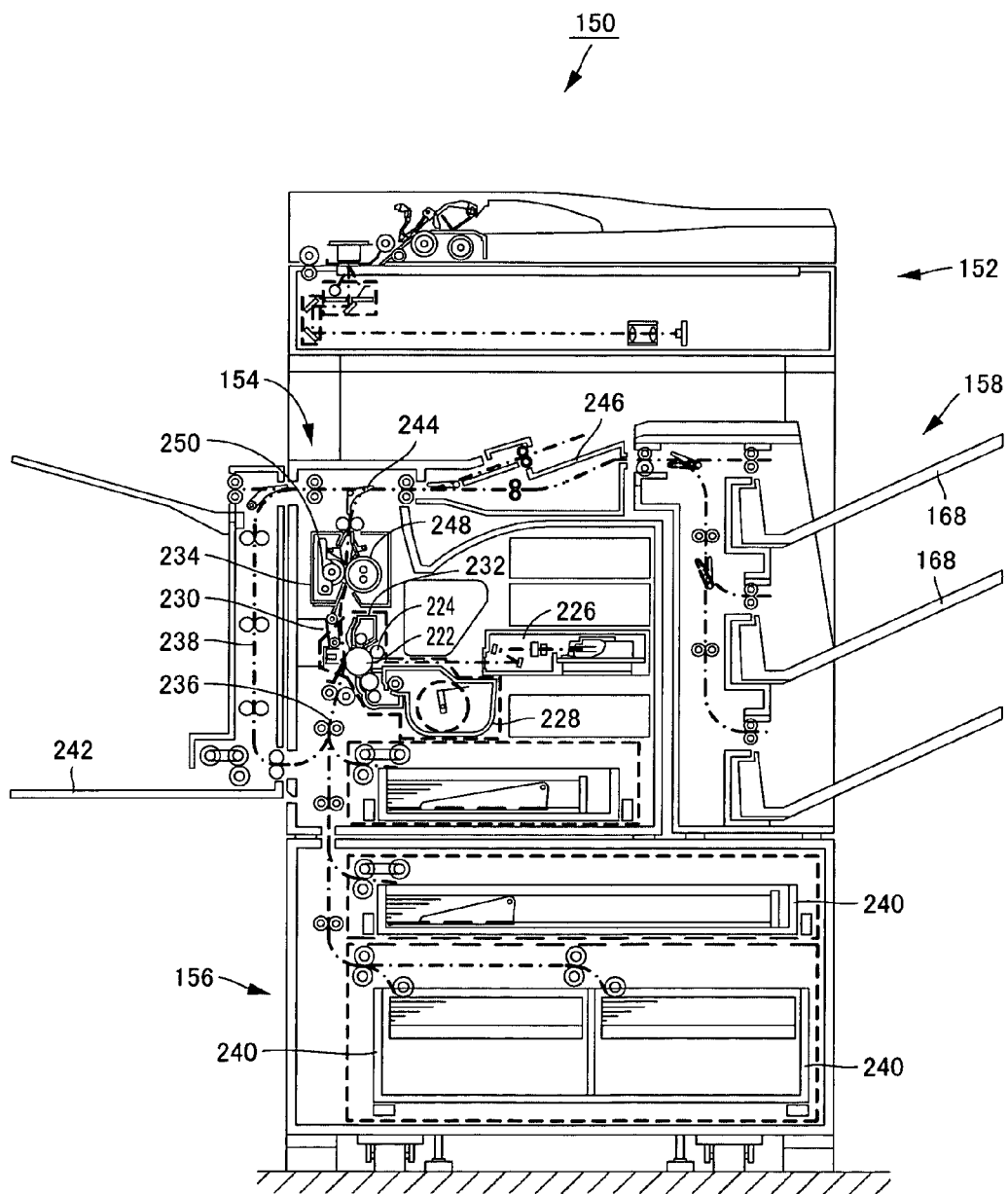
FIG. 4 schematically shows an internal configuration of the image forming apparatus shown in FIG. 1.
Figure 5:
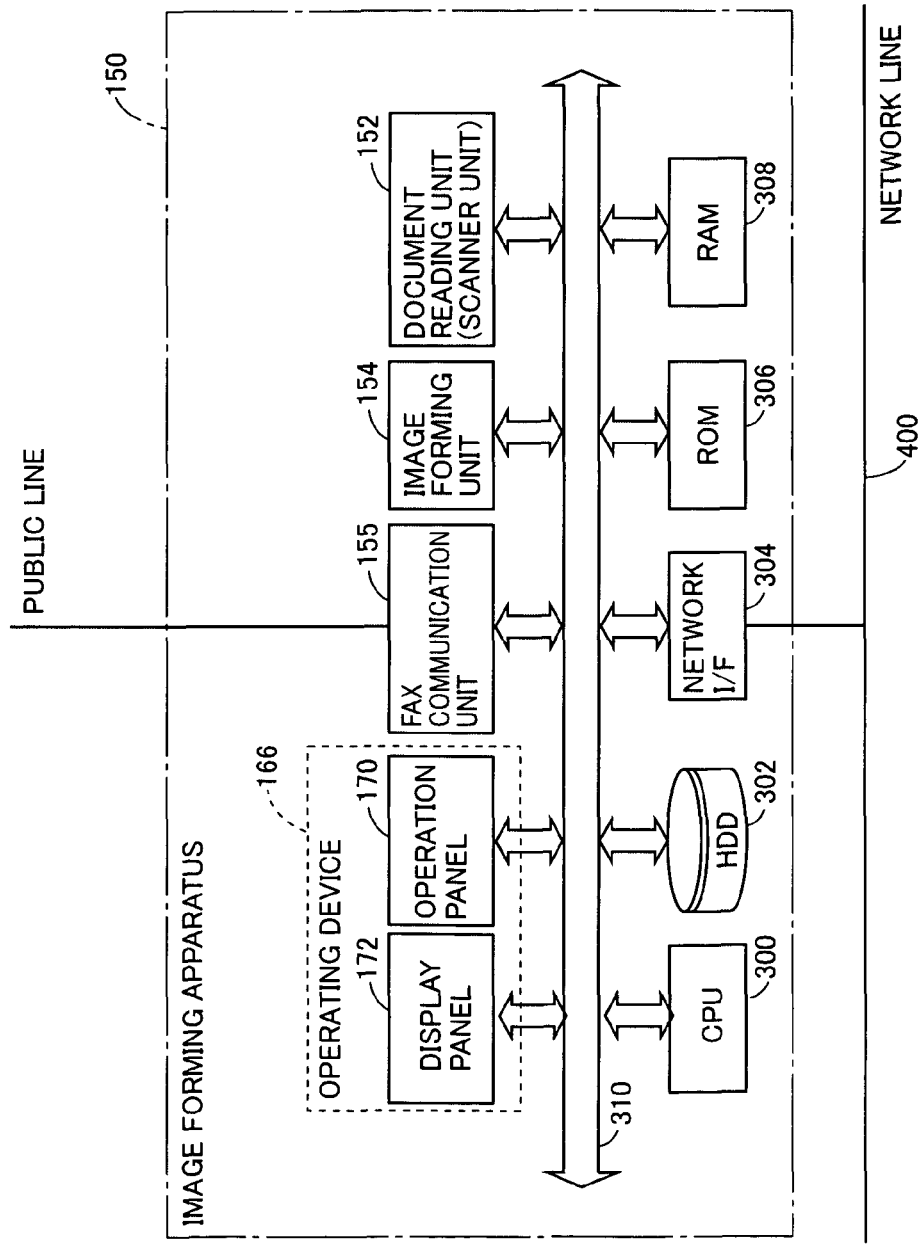
FIG. 5 is a functional block diagram showing hardware configuration of the image forming apparatus shown in FIG. 1.

Referring to FIGS. 3 to 5, image forming apparatus 150 in accordance with the present embodiment will be described.

Referring to FIGS. 3 and 4, image forming apparatus 150 includes a document reading unit 152, an image forming unit 154, a paper feed unit 156, and a paper discharge unit 158.

—Copy Mode—

In the following, an operation in the copy mode will be described. In the copy mode, mainly document reading unit (also referred to as a scanner unit) 152 and image forming unit 154 operate to realize the copy function.

In image forming apparatus 150, a document placed on a platen is read by document reading unit 152 as image data, the read image data is input to CPU 300 implemented, for example, by a microcomputer shown in FIG. 5, the image data is subjected to various image processing operations here, and the resulting image data is output to image forming unit 154.

Image forming unit 154 is for printing an image of the document represented by the image data on a recording medium (in most cases, on a sheet of recording paper), and it includes, by way of example, a photoreceptor drum 222, a charger 224, a laser scanning unit (hereinafter denoted as LSU) 226, a developer 228, a transfer device 230, a cleaning device 232, a fixing device 234 and a neutralizer, not shown.

In image forming unit 154, a main feeding path 236 and a reverse feeding path 238 are provided, and a sheet of recording paper fed from paper feed unit 156 is fed along main feeding path 236. Paper feed unit 156 draws out sheets of recording paper stacked on a paper feed cassette 240 or on a manual feed tray 242 one by one, and feeds the sheet of paper to main feeding path 236 of image forming unit 154.

While the sheet of recording paper is fed along main feeding path 236 of image forming unit 154, the sheet passes between photoreceptor drum 222 and transfer device 230, and further passes through fixing device 234, whereby printing is done on the sheet of recording paper.

Photoreceptor drum 222 rotates in one direction, and its surface is cleaned by cleaning device 232 and the neutralizer and, thereafter, uniformly charged by charger 224.

LSU 226 modulates the laser beam based on the image data to be printed, and repeatedly scans the surface of photoreceptor drum 222 with the laser beam in a main scanning direction, whereby an electrostatic latent image is formed on the surface of photoreceptor drum 222.

Developer 228 develops the electrostatic latent image by supplying toner to the surface of photoreceptor drum 222, and thus, a toner image is formed on the surface of photoreceptor drum 222.

Transfer device 230 transfers the toner image on the surface of photoreceptor drum 222 to the sheet of recording paper passing between transfer device 230 and the photoreceptor drum 222.

Fixing device 234 includes a heating roller 248 for heating the sheet of recording paper and a pressure roller 250 for pressing the sheet of recording paper. As the sheet of recording paper is heated by heating roller 248 and pressed by pressure roller 250, the toner image that has been transferred to the sheet of recording paper is fixed on the sheet. A heater is heated by electric power supplied to fixing device 234 and controlled such that temperature of heating roller 248 attains to an appropriate temperature for fixing.

At a position of connection between main feeding path 236 and reverse feeding path 238, a separation pawl 244 is arranged. When printing is done only on one side of the sheet of recording paper, separation pawl 244 is so positioned that the sheet of recording paper fed from fixing device 234 is guided to paper discharge tray 246 or a paper discharge unit 158.

When printing is done on both sides of the sheet of recording paper, separation pawl 244 is turned to a prescribed direction, so that the sheet of recording paper is guided to reverse feeding path 238. The sheet of recording paper passes through reverse feeding path 238, turned upside-down and again fed to main feeding path 236, and while it is again fed along main feeding path 236, printing is done on its rear surface, and thereafter the sheet is guided to paper discharge tray 246 or to paper discharge unit 158.

The sheet of recording paper printed in the above-described manner is guided to paper discharge tray 246 or to paper discharge unit 158, and discharged to paper discharge tray 246 or to any of paper discharge trays 168 of paper discharge unit 158.

Paper discharge unit 158 may perform a process of sorting a plurality of printed sheets of paper to be output to different discharge trays 168, a process of punching each sheet of recording paper or a process of stapling the sheets of recording paper. Assume that a number of copies of the printing are to be prepared. In that case, sheets of recording paper are sorted and discharged to paper discharge trays 168 such that each tray 168 contains each set of printed sheets, and the set of printed sheets in each tray 168 is stapled or punched, whereby copies of prints are prepared.

—Facsimile Mode—

In the following, an operation in the facsimile mode will be described. In the facsimile mode, document reading unit (scanner unit) 152 and a FAX communication unit 155 mainly operate for a transmission operation and FAX communication unit 155 and image forming unit 154 mainly operate for a reception operation, whereby the facsimile function is realized.

—Transmission Operation

In image forming apparatus 150, when the facsimile mode is designated, a document placed on a platen is read by document reading unit 152 as image data, the read image data is input to CPU 300 implemented, for example, by a microcomputer shown in FIG. 5, the image data is subjected to various image processing operations here, and the resulting image data is output to a FAX communication unit (FAX communication unit 155 of FIG. 5).

FAX communication unit 155 of image forming apparatus 150 on the transmitting side connects a designated transmitting side line to a designated transmission destination, converts the image data to communication data in compliance with facsimile transmission standard, and transmits the converted data to a facsimile machine (such as image forming apparatus 150 having the facsimile function) on the receiving side.

—Communication Operation

When the line is connected, FAX communication unit 155 of image forming apparatus 150 on the receiving side detects a communication request signal from FAX communication unit 155 of image forming apparatus 150 on the transmitting side, and transmits an acknowledgement signal. Thereafter, by way of example, FAX communication units 155 pass performance information supported by transmitting side and receiving side, determine highest possible speed of communication and method of coding/code correction of image data, and set the method of communication of modems. Then, using the image signal format in accordance with the communication method, data is transmitted from FAX communication unit 155 of image forming apparatus 150 on the transmitting side to FAX communication unit 155 of image forming apparatus 150 on the receiving side. When transmission ends, the line is disconnected.

—Reception Operation

FAX communication unit 155 of image forming apparatus 150 on the receiving side converts the received data to image data and passes the data to image forming unit 154. The received data may be converted to image data at image forming unit 154. Image forming unit 154 prints an image of a document represented by the image data converted from the received data on a sheet of recording paper, in a manner similar to the operation in the copy mode described above.

—Scanner Mode—

In the following, an operation in the scanner mode will be described. In the scanner mode, mainly by the operation of document reading unit (scanner unit) 152, the scanner function is realized.

In image forming apparatus 150, a document placed on a platen is read by document reading unit 152 as image data, the read image data is input to CPU 300, the image data is subjected to various image processing operations here, and the resulting image data is stored in a storage device or transmitted to a computer connected to the network through a network interface (network I/F 304 of FIG. 5).

<Image Forming Apparatus: Control Block Configuration>

Referring to FIG. 5, image forming apparatus 150 further includes: an operating device 166 allowing setting functions related to the copy mode, facsimile mode and scanner mode; an ROM 306 for storing programs and the like; a hard disk (HDD) 302 as a non-volatile storage area capable of storing programs and data even when power is cut off; and an RAM (Random Access Memory) 308 for providing a storage area when a program is executed.

Image forming apparatus 150 further includes a bus 310 connected to document reading unit 152, image forming unit 154, FAX communication unit 155, operating device 166, ROM 306, hard disk 302 and RAM 308, and a CPU 300 connected to bus 310, for realizing general functions as the image forming apparatus.

ROM 306 stores programs and data necessary for controlling operations of image forming apparatus 150. CPU 300 controls image forming apparatus 150 in accordance with the programs and data stored in ROM 306, and executes control related to various functions of image forming apparatus 150.

As shown in FIG. 5, a public line is connected for transmitting/receiving image data, to FAX communication unit 155 of image forming apparatus 150. To network I/F 304, network line 400 is connected. To network line 400, server computer 100 transmitting the display information and the end information to image forming apparatus 150 is connected, and a computer using image forming apparatus 150 as a network-supported printer is connected.

RAM 308 provides a function of a working memory for temporarily storing results of operations and processes by CPU 300, and a function of a frame memory for storing image data.

Document reading unit 152, image forming unit 154, a flat, plate-shaped operation panel 170 and display panel 172 of operating device 166, ROM 306, hard disk 302 and RAM 308 are controlled by CPU 300 executing a prescribed program.

Operating device 166 includes: a plate-shaped operation panel 170 arranged on the right side on a surface of operating device 166, provided with hardware keys including ten keys and various other operation buttons; and a display panel 172 formed of a small, touch-panel liquid crystal display device, arranged on the central to the left side of operating device 166. Operation panel 170 and display panel 172 are held in one housing, and operating device 166 is formed integrally to be one piece.

In operating device 166, menu of each mode of image forming apparatus 150, current state of image forming apparatus 150, status of destination designation, and status of job processing are displayed on display panel 172. On a display area of liquid crystal display of display panel 172, selection buttons are displayed. When a portion where the selection button is displayed is pressed, the pressed position is detected by the touch panel. By comparing the display position of the selection button and the position where the touch panel is pressed using a program, setting of a function and instruction of an operation of image forming apparatus 150 becomes possible.

In image forming apparatus 150 in accordance with the present embodiment, when a predetermined transition condition is satisfied, a transition from the normal mode to the screen saver display mode is made, and the screen saver is displayed on display panel 172 based on the display information received from server computer 100. Further, in image forming apparatus 150 in accordance with the present embodiment, when a predetermined returning condition is satisfied, operation mode returns from the screen saver display mode to the normal mode, and the end information received from server computer 100 is displayed on display panel 172.

Image forming apparatus 150 in accordance with the present embodiment may be adapted such that when a predetermined transition condition is satisfied, a transition from the normal mode to the screen saver display mode is made and the screen saver is displayed and, in addition, a transition is made to an energy saving mode in which power supply to fixing device 234 is stopped or reduced. Specifically, image forming apparatus 150 in accordance with the present embodiment may have both the energy saving mode and the screen saver display mode, or only the screen saver display mode.

[Message Management Table Configuration]

Hard disk 106 of server computer 100 stores the display information and the end information (sometimes collectively referred to as messages) corresponding to each piece of identification information in the form of a table shown in FIG. 6. FIG. 6 shows a configuration of the message management table for managing each message to be displayed on a plurality of image forming apparatuses 150.

As shown in FIG. 6, the message management table includes an area for storing the display information, an area for storing the end information, and an area for storing a person who registered the messages, with the identification information used as a key. The identification information is a piece of information that can uniquely identify each image forming apparatus connected to the network image forming system in accordance with the present embodiment.

In the message management table, by way of example, "CONTENT (1)" is stored as the display information and "INFORMATION (1)" is stored as the end information for image forming apparatus 150 identified as "MFP0001", and "ADMIN (A)" (administrator) is stored as the user who is permitted to register, change or delete these messages.

The end information may be detailed information related to the display information, or business information at the workplace where the network image forming system is installed.

The data itself (for example, image display control data and text data) of "CONTENT (1)" and the data itself (for example, text data) of "INFORMATION (1)" are separately stored in hard disk 106.

[Software Configuration]

In the network image forming system in accordance with the present embodiment, when no user operation is made for a predetermined time period or longer in image forming apparatus 150, a process for displaying the screen saver on display panel 172 based on the display information (for example, the information specified by "CONTENT (1)") received from server computer 100, is executed. Further, in the network image forming system, when the user touches display panel 172 of image forming apparatus 150 displaying the screen saver, a process for displaying information useful for the user (and information the administrator wants to give to the user) on display panel 172 for a predetermined length of time before transition from the screen saver to the initial image is made, based on the end information (for example, information specified by "INFORMATION (1)") received from server computer 100, is executed. Such processes are realized by software executed using the hardware configuration described above. In the following, software configuration will be described.

Figure 7:
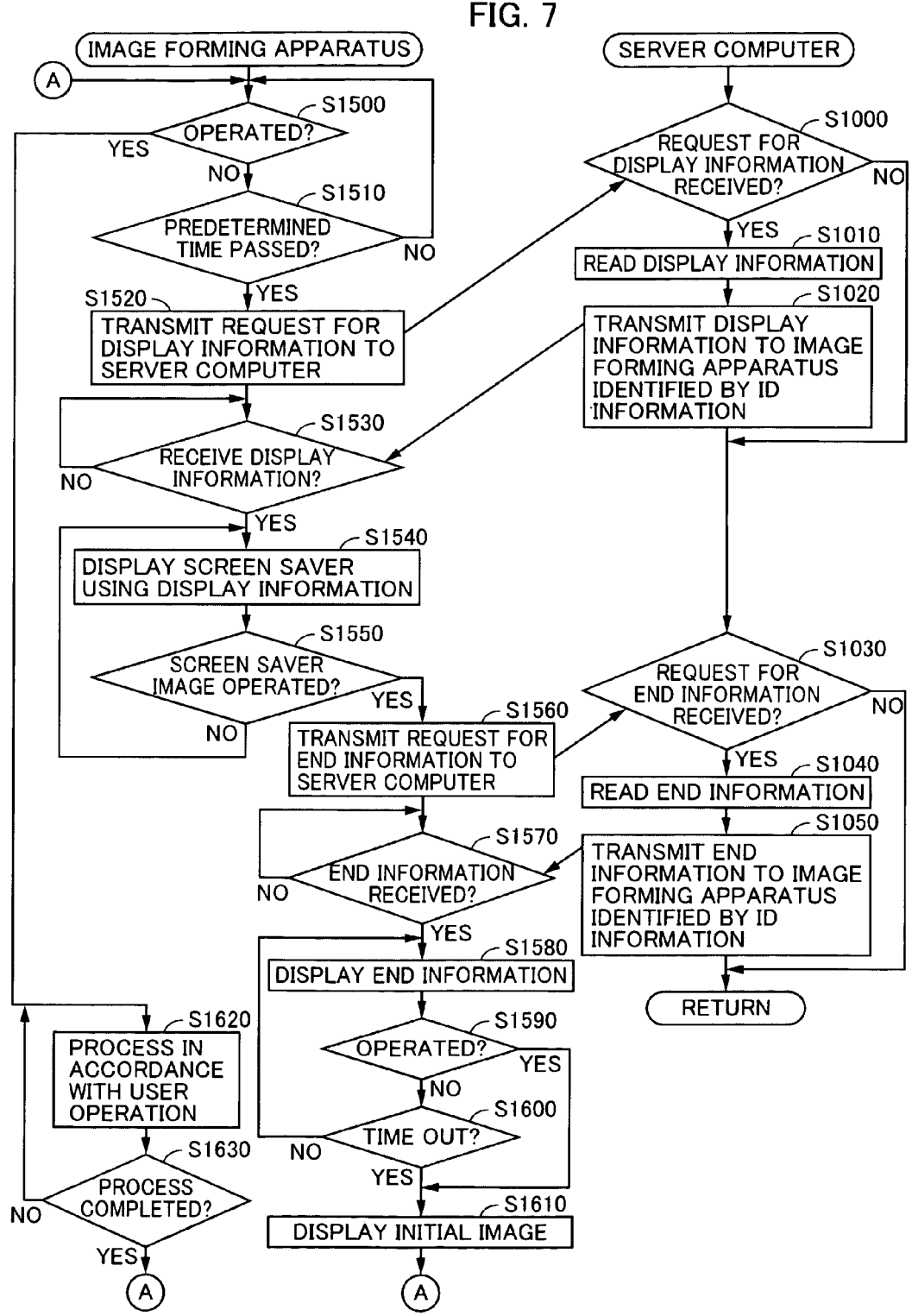
FIG. 7 is a flowchart representing a control structure of a program executed by the image forming apparatus and the server computer in accordance with an embodiment of the present invention.

The flowchart shown on the right side of FIG. 7 shows a control structure of the program executed by server computer 100. CPU 110 of server computer 100 executes, in parallel with such a program, a program for realizing general functions of a computer. The program, however, is not directly related to the characteristic portion of the present invention and, therefore, details thereof will not be described here.

Referring to FIG. 7, at step (hereinafter "step" will be denoted as "S") 1000, CPU 110 of server computer 100 (hereinafter simply referred to as CPU 110) determines whether or not a signal requesting the display information has been received from image forming apparatus 150. This process corresponds to the process of S1520 described later. Here, image forming apparatus 150 transmits the identification information for uniquely identifying the image forming apparatus 150 together with the signal requesting the display information to server computer 100 and, therefore, CPU 110 also receives the identification information. If it is determined that the signal requesting the display information is received from image forming apparatus 150 (YES at S1000), the process proceeds to S1010. Otherwise (NO at S1000), the process proceeds to S1030.

At S1010, CPU 110 looks up the message management table (FIG. 6) stored in hard disk 106, and reads the display information stored in relation to the received identification information.

At S1020, CPU 110 transmits the display information read from hard disk 106 to image forming apparatus 150 identified by the identification information.

At S1030, CPU 110 determines whether or not a signal requesting the end information has been received from image forming apparatus 150. This process corresponds to the process of S1560, which will be described later. Here again, image forming apparatus 150 transmits the identification information for uniquely identifying the image forming apparatus 150 together with the signal requesting the end information to server computer 100 and, therefore, CPU 110 also receives the identification information. If it is determined that the signal requesting the end information is received from image forming apparatus 150 (YES at S1030), the process proceeds to S1040. Otherwise (NO at S1030), the process ends.

At S1040, CPU 110 looks up the message management table (FIG. 6) stored in hard disk 106, to read the end information stored in relation to the received identification information.

At S1050, CPU 110 transmits the end information read from hard disk 106 to image forming apparatus 150 identified by the identification information.

In the flowchart shown on the right side of FIG. 7, the process of S1000 to S1020 and the process of S1030 to S1050 may each be prepared as a separate subroutine.

The flowchart shown on the left side of FIG. 7 shows a control structure of the program executed by image forming apparatus 150. CPU 300 of image forming apparatus 150 executes, in parallel with such a program, a program for realizing general functions of an image forming apparatus having a plurality of functions. The program, however, is not directly related to the characteristic portion of the present invention and, therefore, details thereof will not be described here.

Referring to FIG. 7, at S1500, CPU 300 of image forming apparatus 150 (hereinafter simply referred to as CPU 300) determines whether or not a user operation has been made on operating device 166. At this time, if the user presses a hardware key of plate-shaped operation panel 170 or touch-panel type display panel 172, CPU 300 determines that the user operation of operating device 166 is made. If it is determined that the user operation is made on operating device 166 (YES at S1500), the process proceeds to S1620. Otherwise (NO at S1500), the process proceeds to S1510.

At S1510, CPU 300 determines whether or not a predetermined time period has passed. Here, the predetermined time period is the time to make a transition from the normal mode to the screen saver display mode. If it is determined that the predetermined time period has passed (YES at S1510), the process proceeds to S1520. Otherwise (NO at S1510), the process returns to S1500 and determines presence/absence of any user operation.

At S1520, CPU 300 transmits the signal requesting the display information to server computer 100. Here, CPU 300 also transmits the identification information identifying itself in the network image forming system, to server computer 100.

At S1530, CPU 300 determines whether or not the display information is received from server computer 100. This process corresponds to the process of S1020 described above. If it is determined that the display information is received from server computer 100 (YES at S1530), the process proceeds to S1540. Otherwise (NO at S1530), the process returns to S1530, and waits until it is determined that the display information is received from server computer 100. If the display information is not received from server computer 100 even after a prescribed time period from transmission of the signal requesting the display information to server computer 100 at S1520, a process for addressing a communication time out error may be performed.

At S1540, the screen saver is displayed on display panel 172 using the received display information. At this time, power supply to fixing device 234 may be stopped. As regards the communication time out error mentioned above, every time a piece of display information is received from server computer 100, the piece of display information may be stored in hard disk 302, and if the display information is not received from server computer 100, the piece of display information stored in hard disk 302 in the last process may be read from hard disk 302, and the screen saver is displayed on display panel 172 using the piece of display information read from hard disk 302.

At S1550, CPU 300 determines whether or not the user operated (touched) display panel 172 displaying the screen saver. If it is determined that the user touched display panel 172 (YES at S1550), the process proceeds to S1560. Otherwise (NO at S1550), the process proceeds to S1540. The user operation here is not limited to touching of display panel 172. By way of example, the operation may be pressing of a hardware key on operation panel 170.

While the process proceeds from S1500 to S1550, as long as it is determined that the user operation is not made (NO at S1500), the elapsed time is counted. If the elapsed time exceeds the predetermined time period (YES at S1510), the request for the display information is sent to server computer 100 (S1520). Receiving the display information (YES at S1530), the screen saver based on the display information is displayed on display panel 172 (S1540). Thereafter, as long as it is determined that the user operation is not made (NO at S1550), the switched-in screen saver display mode is continued.

At S1560, CPU 300 transmits the signal requesting the end information to server computer 100. At this time, CPU 300 also transmits the identification information identifying itself in the network image forming system to server computer 100.

At S1570, CPU 300 determines whether or not the end information is received from server computer 100. This process corresponds to the process of S1050 described above. If it is determined that the end information is received from server computer 100 (YES at S1570), the process proceeds to S1580. Otherwise (NO at S1570), the process is returned to S1570, and waits until it is determined that the end information is received from server computer 100. As in the reception determination of the display information described above, if the end information is not received from server computer 100 even after a prescribed time period from transmission of the signal requesting the end information to server computer 100 at S1560, a process for addressing a communication time out error may be performed.

At S1580, using the end information received from server computer 100, CPU 300 displays the information on display panel 172, between the screen saver and the initial image. Here, if the power supply to fixing device 234 has been stopped, power supply is resumed. Further, as regards the communication time out error described above, every time a piece of end information is received from server computer 100, the piece of end information may be stored in hard disk 302, and if the end information is not received from server computer 100, the piece of end information stored in hard disk 302 in the last process may be read from hard disk 302, and the information is displayed on display panel 172 using the piece of end information read from hard disk 302.

At S1590, CPU 300 determines whether or not the user operated (touched) the display panel on which the information is displayed using the end information. If it is determined that the user has touched display panel 172 (YES at S1590), the process proceeds to S1610. Otherwise (NO at S1590), the process proceeds to S1600. Here again, the user operation is not limited to touching of display panel 172. By way of example, the operation may be pressing of a hardware key on operation panel 170.

At S1600, CPU 300 determines whether a timer of which count started when the information using the end information is displayed at S1580 has been counted up. If the timer is determined to be counted up (YES at S1600), the process proceeds to S1610. Otherwise (NO at S1600), the process returns to S1580, and the display using the end information is continued.

The timer is a down-timer that counts down from a set value and if the remaining time expires, it is determined to be a time-out. The set value for the timer is sufficient for the user to recognize the information displayed using the end information. Further, the set value for the timer may be stored in a column of remarks in the message management table of server computer 100 (longer set value may preferably stored if the amount of information is larger), image forming apparatus 150 may receive the set value together with the end information from server computer 100, and image forming apparatus 150 may change the set value for the timer.

At S1610, CPU 300 displays the initial image of the normal mode (the mode different from the screen saver display mode) of image forming apparatus 150 on display panel 172. Thereafter, the process returns to S1500.

While the process proceeds from S1580 to S1610, as long as it is determined that the user operation is not made with the information based on the end information being displayed, the time is counted down (NO at S1590) and the information based on the end information is continuously displayed until time-out (YES at S1600). If it is determined that the user operation is made (YES at S1590) before time is up (NO at S1600), that is, user operation is made while the information based on the end information is being displayed on display panel 172, the initial image is immediately displayed (without waiting until time-out of the timer).

At S1620, CPU 300 executes the image forming process in accordance with the user operation. At S1630, CPU 300 determines whether or not the image forming process executed in accordance with the user operation is completed. If the image forming process is determined to be completed (YES at S1630), the process returns to S1500. Otherwise (NO at S1630), the process returns to S1620.

[Operation]

The operation of server computer 100 and image forming apparatus 150 of the network image forming system in accordance with the present embodiment, based on the structure and flowchart above, will be described with reference to the exemplary images displayed on display panel 172 shown in FIGS. 8 to 11. It is assumed that the initial image on display panel 172 of image forming apparatus 150 is as shown in FIG. 11.

Figure 11:
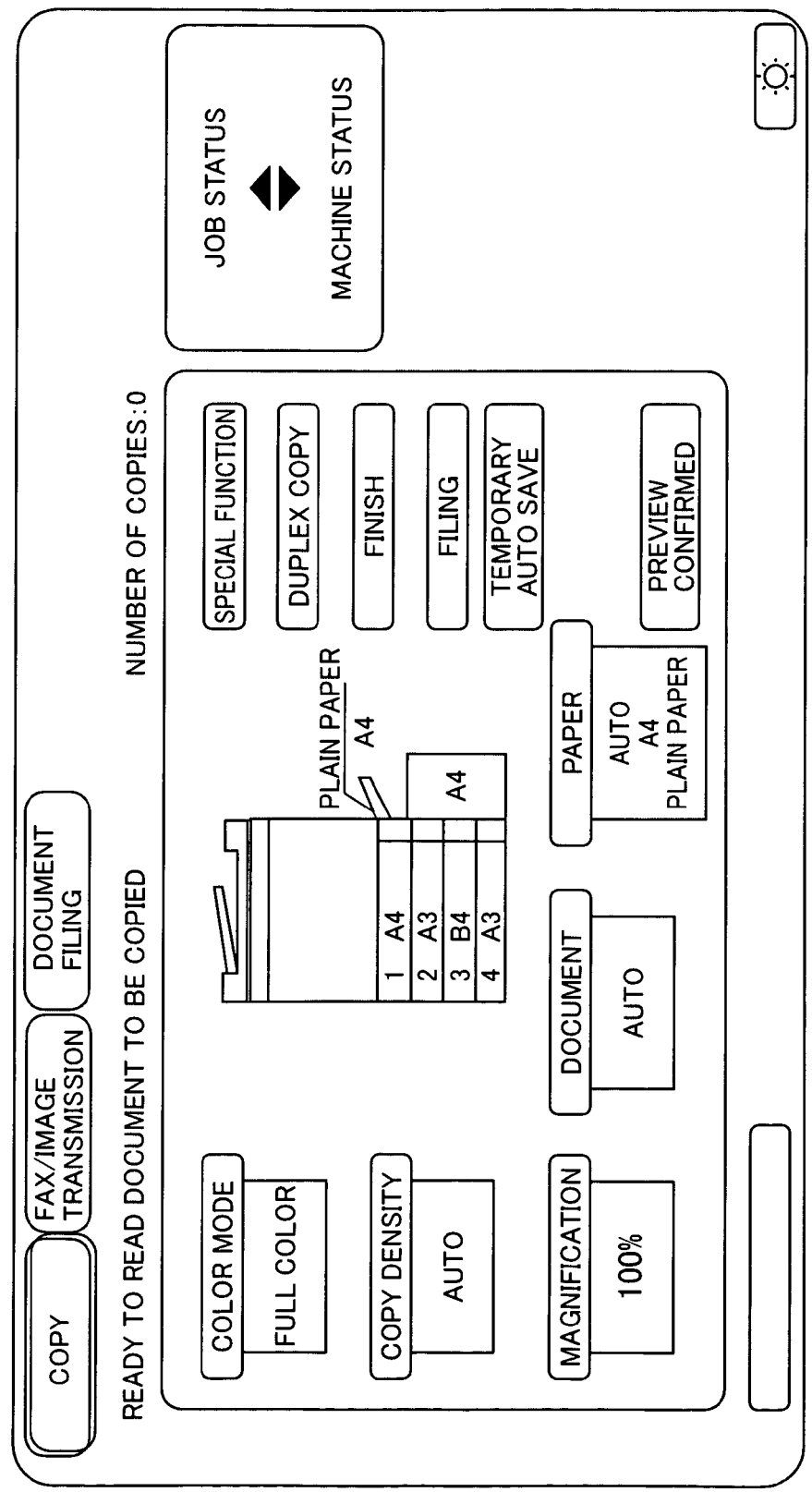

If the predetermined time period passes (YES at S1510) while the image shown in FIG. 11 is displayed and the user does not press any hardware key on operation panel 170 or the touch-panel type display panel 172 (NO at S1500), the signal requesting the display information for displaying the screen saver on display panel 172 is transmitted to server computer 100 (S1520).

In response to transmission of the request signal from image forming apparatus 150 (YES at S1520, S1000), the display information stored in message management table (FIG. 6) is read from hard disk 106 of server computer 100 (S1010), using the identification information identifying the image forming apparatus 150 that transmitted the request signal. The display information read from hard disk 106 is transmitted to image forming apparatus 150 that transmitted the request signal (S1020).

Figure 8:
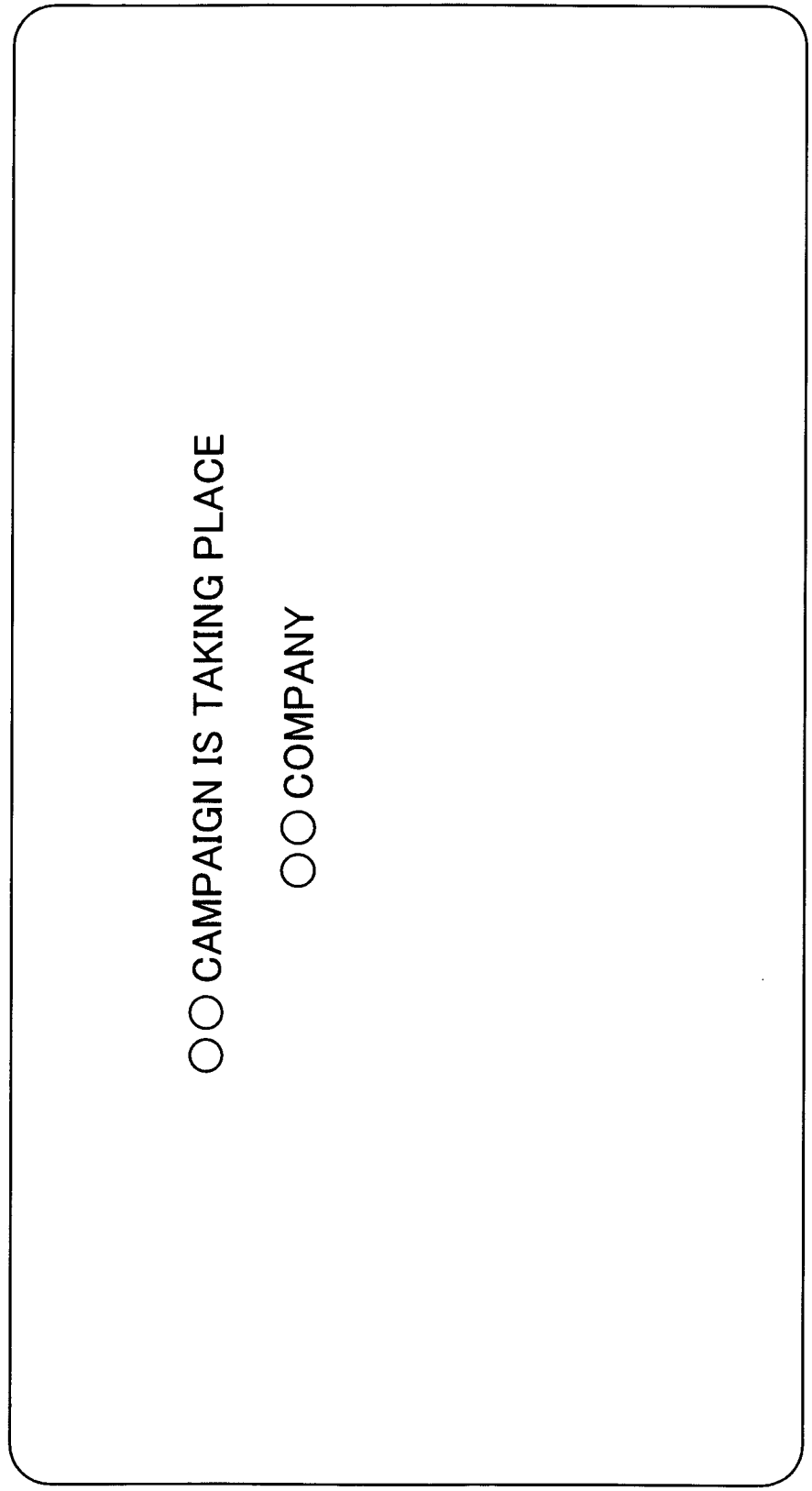

In response to transmission of the display information from server computer 100 (YES at S1020, S1530), the screen saver is displayed on display panel 172 using the received display information (S1540). FIG. 8 shows an exemplary display on display panel 172 at this time.

As shown in FIG. 8, as the screen saver formed by the display information, "○○ CAMPAIGN IS TAKING PLACE ○○ COMPANY" is displayed on display panel 172. When the user touches display panel 172 displaying the image of FIG. 8 (YES at S1550), the signal requesting the end information for the display at the end of screen saver on display panel 172 is transmitted to server computer 100 (S1560).

In response to transmission of the request signal from image forming apparatus 150 (YES at S1560, S1030), the end information stored in the message management table (FIG. 6) is read from hard disk 106 of server computer 100 (S1040), using the identification information identifying image forming apparatus 150 that transmitted the request signal. The end information read from hard disk 106 is transmitted to image forming apparatus 150 that transmitted the request signal (S1050).

In response to transmission of the end information from server computer 100 (YES at S1050, S1570), using the received end information, during transition from the screen saver to the initial image, the image based on the end information is displayed on display panel 172 (S1580). FIGS. 9 and 10 show exemplary images displayed on display panel 172 at this time.

As shown in FIG. 9, more detailed information related to the information "○○ CAMPAIGN IS TAKING PLACE ○○ COMPANY" that has been displayed as the screen saver may be displayed on display panel 172. Here, information related to details of the method of application for the campaign is displayed on display panel 172. Further, a message "IF YOU ARE IN A HURRY, PLEASE TOUCH THE SCREEN" is displayed on display panel 172.

Further, information that is not related to the information that has been displayed as the screen saver but is useful for the user using image forming apparatus 150 may be displayed on display panel 172 as shown in FIG. 10. Here, as the information the administrator of the network image forming system wants to give to the user (information useful for the user), detailed information related to the shut-down of the network function in the network image forming system is displayed on display panel 172. Further, as in FIG. 9, the message "IF YOU ARE IN A HURRY, PLEASE TOUCH THE SCREEN" is displayed on display panel 172, as shown in FIG. 10.

If the user touches display panel 172 while the image shown in FIG. 9 or FIG. 10 is displayed (before time-out) (YES at S1590), image forming apparatus 150 displays the initial image of image forming apparatus 150 on display panel 172 (S1610). FIG. 11 shows an exemplary image displayed on display panel 172 at this time.

If the user does not make any operation while the image shown in FIG. 9 or FIG. 10 is displayed on display panel 172 (NO at S1590), the image shown in FIG. 9 or FIG. 10 is continuously displayed on display panel 172 until time is up (until the determination at S1600 becomes YES) (S1580).

As shown in FIG. 11, the initial image of image forming apparatus 150 is displayed on display panel 172. If the user performs an operation as requested on the initial image (YES at S1500), the image forming process is executed in accordance with the user operation (S1620). When the image forming process executed in accordance with the user operation is completed (YES at S1630), the display on display panel 172 returns to the image of FIG. 11.

Thereafter, if the user further presses any hardware key on operation panel 170 or the touch-panel type display panel 172 while the initial image shown in FIG. 11 is displayed (YES at S1500), the image forming process is executed in accordance with the user operation (S1620).

If the user does not press any hardware key on operation panel 170 or the touch-panel type display panel 172 while the initial image shown in FIG. 11 is displayed (NO at S1500) and the predetermined time passes (YES at S1510), the screen saver shown in FIG. 8 is displayed using the display information received from server computer 100 on display panel 172 (S1520 to S1540).

If the user does not make any operation while the image shown in FIG. 8 is displayed on display panel 172 (NO at S1550), image forming apparatus 150 continuously displays the screen saver on display panel 172 (S1540).

As described above, in the image forming apparatus in accordance with the present embodiment, if the user does not make any operation for a predetermined time period, a screen saver is displayed on the display panel. If the user touches the display panel while the screen saver is being displayed, information based on the end information is displayed before the initial image is displayed on the display panel. Therefore, it is possible to display information useful for the user on the display panel of the image forming apparatus, while the display panel is in the field of view of the user. As a result, it becomes possible to notify the user of information useful for the user or information the administrator wants to give to the user of the image forming apparatus.

The time for making a transition to the screen saver display mode ("predetermined time period" of S1510) may be appropriately set by the user or by the administrator.

Further, it is not always necessary for image forming apparatus 150 to request server computer 100 for the display information every time the transition condition from the normal mode to the screen saver display mode is satisfied or to request server computer 100 for the end information every time the return condition from the screen saver display mode to the normal mode is satisfied. By way of example, image forming apparatus 150 may request server computer 100 for the display information and the end information once a day at a predetermined time (preferably, in the time slot when communicate traffic is low), store the obtained display information and the end information in hard disk 302, and the display information or the end information may be read from hard disk 302 every time the condition is satisfied.

<Modification>

In the following, modifications of the image forming apparatus in accordance with the present invention will be described. The configuration of the image forming apparatus (FIGS. 3 to 5) is the same as that of the embodiment above and, therefore, detailed description thereof will not be repeated here. Similar to the embodiment above, the present invention is applicable to information equipment other than such an image forming apparatus.

Image forming apparatus 150 in accordance with the present modification is different from the embodiment described above in that one or more pieces of display information and one or more pieces of end information shown in the message management table of FIG. 6 are stored in hard disk 302, and that the program executed by CPU 300 does not communicate with server computer 100 (in the present modification, the server computer is not essential). Except for these points, the modification is the same as the embodiment described above. Since the configuration and functions are the same, detailed description thereof will not be repeated here.

In FIG. 12, the same processes as those of corresponding FIG. 7 are denoted by the same step numbers. The contents of each process are the same as those of the embodiment above and, therefore, detailed description thereof will not be repeated. As in the embodiment described above, CPU 300 of image forming apparatus 150 executes, in parallel with such a program, a program for realizing general functions of an image forming apparatus. The program, however, is not directly related to the characteristic portion of the present invention and, therefore, details thereof will not be described here.

Referring to FIG. 12, at S2000, CPU 300 reads the display information stored in image forming apparatus 150. Here, CPU 300 reads the display information stored in hard disk 302.

At S2010, CPU 300 reads the end information stored in itself. Here, CPU 300 reads the end information stored in hard disk 302.

In image forming apparatus 150 in accordance with the present modification based on the configuration and flow chart as described above, without communication with the server computer performed in the embodiment above, it is possible to display the information based on the end information on the display panel when the user touches the display panel while the screen saver is displayed, in the similar manner as in the embodiment above.

The display information and the end information stored in hard disk 302 of image forming apparatus 150 may be stored in image forming apparatus 150 as in the present modification and, in addition, such information may be registered, changed or deleted using a personal computer connected to network line 400. By way of example, a user having administrative right may log-in to the network using a personal computer, activate browser software displaying various settings of image forming apparatus 150 in a changeable manner, and edit the display information and the end information stored in hard disk 302 of image forming apparatus 150.

<Further Modification>

In an image forming apparatus, when a bulk image forming process (copy process) is executed (no matter whether a state in which user operation is absent is continued or not), a screen saver may be displayed based on the display information on display panel 172, or information useful for the user based on the end information may be displayed on display panel 172. Particularly, when the end information is displayed on display panel 172, it is possible to give useful information to the user who is simply waiting until the completion of copy process.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. Information equipment switching display of an operation image and a standby image, comprising:
   a display device displaying information to a user;
   an operating device to be operated by the user; and
   a control device controlling said display device; wherein
      said display device and said operating device are arranged close to each other; and
   control device includes:
      a transition control unit controlling said display device such that said standby image is displayed if a predetermined transition condition related to a state of said information equipment is satisfied,
      a return control unit controlling said display device such that said operation is displayed if a predetermined return condition related to a user operation using said information equipment is satisfied, and
      a switch control unit controlling said display device such that, when a request for displaying said operation image is issued from said return control unit while said standby image is being displayed and transition is made from said standby image to said operation image in response to said request, a specific image including a piece of information different from said operation image and said standby image is displayed after ending display of said standby image and before starting display of said operation image, when said standby image is switched to said operation image.

2. The information equipment according to claim 1, wherein said switch control unit includes a first control unit controlling said display device such that said specific image is displayed for a time period of a predetermined length.

3. The information equipment according to claim 2, wherein said switch control unit further includes a second control unit controlling said display device such that said operation image is displayed if the user operates said operating device in the time period in which said specific image is displayed.

4. The information equipment according to claim 1, wherein said specific image includes a piece of information related to information included in said standby image.

5. The information equipment according to claim 1, wherein said specific image includes a piece of information related to the user using said information equipment.

6. The information equipment according to claim 1, wherein said transition control unit includes a transition unit controlling said display device such that said standby image is displayed if a condition that the user does not operate said operating device for a time period of a predetermined length is satisfied.

7. The information equipment according to claim 1, wherein said return control unit includes a return unit controlling said display device such that said operation image is displayed if a condition that the user operated said operating device is satisfied.

8. The information equipment according to claim 1, wherein said standby image is a screen saver image.

9. The information equipment according to claim 1, wherein said display device includes a pressure-sensitive selection button for realizing a function of said operating device.

10. The information equipment according to claim 1, further comprising:
a communication device for communication with external equipment; and
a receiving device receiving either a piece of information for displaying said standby image or a piece of information for displaying said specific image, from said external equipment.

11. An image forming apparatus, comprising:
the information equipment according to claim 1; and
an image forming unit forming an image on a sheet of recording paper.

12. The image forming apparatus according to claim 11, further comprising a display control unit controlling said display device such that said specific image is displayed during image formation on recording paper by said image forming unit.

13. In information equipment switching display of an operation image and a standby image, including a display device displaying information to a user and an operating device to be operated by the user arranged close to said display device, a method of display comprising the steps of:
controlling said display device such that said standby image is displayed if a predetermined transition condition related to a state of said information equipment is satisfied;
controlling said display device such that said operation image is displayed if a predetermined return condition related to a user operation using said information equipment is satisfied; and
controlling said display device such that, when a request for displaying said operation image is issued while said standby image is being displayed and transition is made from said standby image to said operation image in response to said request, a specific image including a piece of information different from said operation image and said standby image is displayed after ending display of said standby image and before starting display of said operation image, when said standby image is switched to said operation image.

* * * * *